US012217897B2

(12) United States Patent
Oshima et al.

(10) Patent No.: US 12,217,897 B2
(45) Date of Patent: Feb. 4, 2025

(54) MULTILAYER COIL COMPONENT

(71) Applicant: TDK CORPORATION, Tokyo (JP)

(72) Inventors: Yuya Oshima, Tokyo (JP); Junichi Otsuka, Tokyo (JP); Shinichi Kondo, Tokyo (JP); Yohei Tadaki, Tokyo (JP); Kazuo Iwai, Tokyo (JP); Masayuki Suzuki, Yurihonjo (JP); Emiri Matsuhashi, Tokyo (JP); Takuya Niibori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 724 days.

(21) Appl. No.: 17/368,332

(22) Filed: Jul. 6, 2021

(65) Prior Publication Data

US 2022/0013278 A1 Jan. 13, 2022

(51) Int. Cl.

| | |
|---|---|
| ***H01F 27/28*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ......... *H01F 27/2804* (2013.01); *H01F 27/29* (2013.01); *H01F 27/323* (2013.01); *H01F 41/041* (2013.01); *H01F 2027/2809* (2013.01)

(58) Field of Classification Search

CPC .... H01F 27/2804; H01F 27/29; H01F 27/323; H01F 2027/2809; H01F 27/292; H01F 27/34; H01F 17/0013; H01F 17/04; H01F 2017/0046; H01F 2017/048

See application file for complete search history.

(56) References Cited

U.S. PATENT DOCUMENTS 7,170,384 B2 * 1/2007 Kim ........................ H05K 1/165 336/200
7,868,727 B2 * 1/2011 Chen ................... H01F 17/0013 336/200
7,986,211 B2 * 7/2011 Kim ........................ H01L 28/10 336/200
9,275,786 B2 * 3/2016 Berdy ................... H01F 41/041
2003/0001711 A1 * 1/2003 Tanaka ................ H01F 17/0013 336/200

(Continued)

FOREIGN PATENT DOCUMENTS

JP 2002-252117 A 9/2002
JP 2004-193512 A 7/2004

(Continued)

*Primary Examiner* — Mang Tin Bik Lian
(74) *Attorney, Agent, or Firm* — Oliff PLC

(57) ABSTRACT

A multilayer coil component includes an element body, first and second coils, and a pair of external electrodes. The element body includes a plurality of insulator layers laminated in a first direction. The element body has a pair of end surfaces opposing each other in a second direction orthogonal to the first direction. The first coil and the second coil are disposed in the element body and respectively have coil shafts along the second direction. The pair of external electrodes are disposed on the pair of end surfaces and electrically connected to both ends of the first coil and the second coil. The first coil includes a first conductor layer, a second conductor layer, and a first through hole conductor. The coil shaft of the first coil is disposed inside the second coil.

20 Claims, 5 Drawing Sheets

(56) References Cited

U.S. PATENT DOCUMENTS

| | | | | |
|---|---|---|---|---|
| 2009/0278649 | A1* | 11/2009 | Tatsukawa | H01F 41/0233 336/200 |
| 2011/0100527 | A1 | 5/2011 | Tatsukawa et al. | |
| 2014/0266551 | A1* | 9/2014 | Yokoyama | H01F 27/29 336/200 |
| 2015/0235753 | A1* | 8/2015 | Chatani | H01F 27/2804 336/200 |
| 2016/0172102 | A1 | 6/2016 | Jeong et al. | |
| 2017/0278608 | A1* | 9/2017 | Kusunoki | H01F 6/006 |
| 2017/0301453 | A1 | 10/2017 | Jo et al. | |
| 2018/0041182 | A1* | 2/2018 | Nishida | H03H 7/1791 |
| 2018/0096769 | A1* | 4/2018 | Sekiguchi | H01F 41/04 |
| 2018/0130595 | A1* | 5/2018 | Choi | H01F 17/0013 |

FOREIGN PATENT DOCUMENTS

| | | | |
|---|---|---|---|
| JP | 2014-138168 | A | 7/2014 |
| JP | 2017-191923 | A | 10/2017 |
| WO | 2005/052962 | A1 | 6/2005 |

* cited by examiner

MULTILAYER COIL COMPONENT

TECHNICAL FIELD

The present disclosure relates to a multilayer coil component.

BACKGROUND

A known multilayer coil component includes an element body including a plurality of laminated insulator layers, a coil disposed in the element body, and a pair of external electrodes disposed on the end surfaces of the element body (see, for example, Japanese Unexamined Patent Publication No. 2002-252117). In the multilayer coil component described in Japanese Unexamined Patent Publication No. 2002-252117, the axial direction of the coil coincides with the direction in which the pair of external electrodes oppose each other, and thus the stray capacitance formed between the coil and the external electrode can be reduced. As a result, a decline in the self-resonant frequency (SRF) of the multilayer coil component is suppressed and high frequency characteristics is improved.

SUMMARY

It is necessary to reduce the direct current resistance of the coil in order to increase an electric current flowing through the coil. Japanese Unexamined Patent Publication No. 2002-252117 discloses a configuration including two coils arranged in parallel. However, in this configuration, the inner diameter of each coil is small, and thus the inductance decreases.

An object of the present disclosure is to provide a multilayer coil component can improve high frequency characteristics and reduce the direct current resistance of a coil while maintaining a high inductance.

A multilayer coil component according to the present disclosure includes an element body, first and second coils, and a pair of external electrodes. The element body includes a plurality of insulator layers laminated in a first direction. The element body has a pair of end surfaces opposing each other in a second direction orthogonal to the first direction. The first coil and the second coil are disposed in the element body and respectively have coil shafts along the second direction. The pair of external electrodes are disposed on the pair of end surfaces and electrically connected to both ends of the first coil and the second coil. The first coil includes a first conductor layer, a second conductor layer, and a first through hole conductor. The first through hole conductor extends in the first direction and connects the first conductor layer and the second conductor layer. The second coil includes a third conductor layer, a fourth conductor layer, and a second through hole conductor. The second through hole conductor extends in the first direction and connects the third conductor layer and the fourth conductor layer. The coil shaft of the first coil is disposed inside the second coil. The first conductor layer and the third conductor layer are separated from each other in the first direction. The first conductor layer and the third conductor layer intersect with each other when viewed from the first direction.

In this multilayer coil component, the coil shaft of the first coil and the coil shaft of the second coil are along the second direction, in which the pair of end surfaces oppose each other. Accordingly, the stray capacitance formed between the first and second coils and the external electrode can be reduced and high frequency characteristics can be improved. The coil shaft of the first coil is disposed inside the second coil. The first conductor layer and the third conductor layer are separated from each other in the first direction and intersect with each other when viewed from the first direction. With such a configuration, the first coil and the second coil can constitute a large spiral while intersecting with each other. As a result, the inductance can be increased.

The second conductor layer and the fourth conductor layer may be separated from each other in the first direction and intersect with each other when viewed from the first direction. In this case, the first coil and the second coil can increase the numbers of turns while intersecting with each other.

The first conductor layer and the fourth conductor layer may be disposed at the same position in the first direction. In this case, it is easy to further increase the inner diameter of the first coil and the inner diameter of the second coil.

The second conductor layer and the third conductor layer may be disposed at the same position in the first direction. In this case, it is easy to further increase the inner diameter of the first coil and the inner diameter of the second coil.

The multilayer coil component may further include a plurality of fifth conductor layers electrically connecting the first coil and the second coil to the external electrode. In this case, the electric resistance can be reduced as compared with a case where the fifth conductor layer includes a single layer.

A thickness of each of the fifth conductor layers may be smaller than a thickness of the first conductor layer, a thickness of the second conductor layer, a thickness of the third conductor layer, and a thickness of the fourth conductor layer. In this case, it is possible to easily cut a laminated body substrate together with the plurality of fifth conductor layers in turning the element bodies into individual pieces by cutting the laminated body substrate.

The plurality of fifth conductor layers may be disposed between the first conductor layer and the second conductor layer in the first direction and may be disposed between the third conductor layer and the fourth conductor layer in the first direction. In this case, it is possible to easily increase the inner diameters of the first coil and the second coil by increasing the number of the fifth conductor layers.

DETAILED DESCRIPTION

Figure 1:
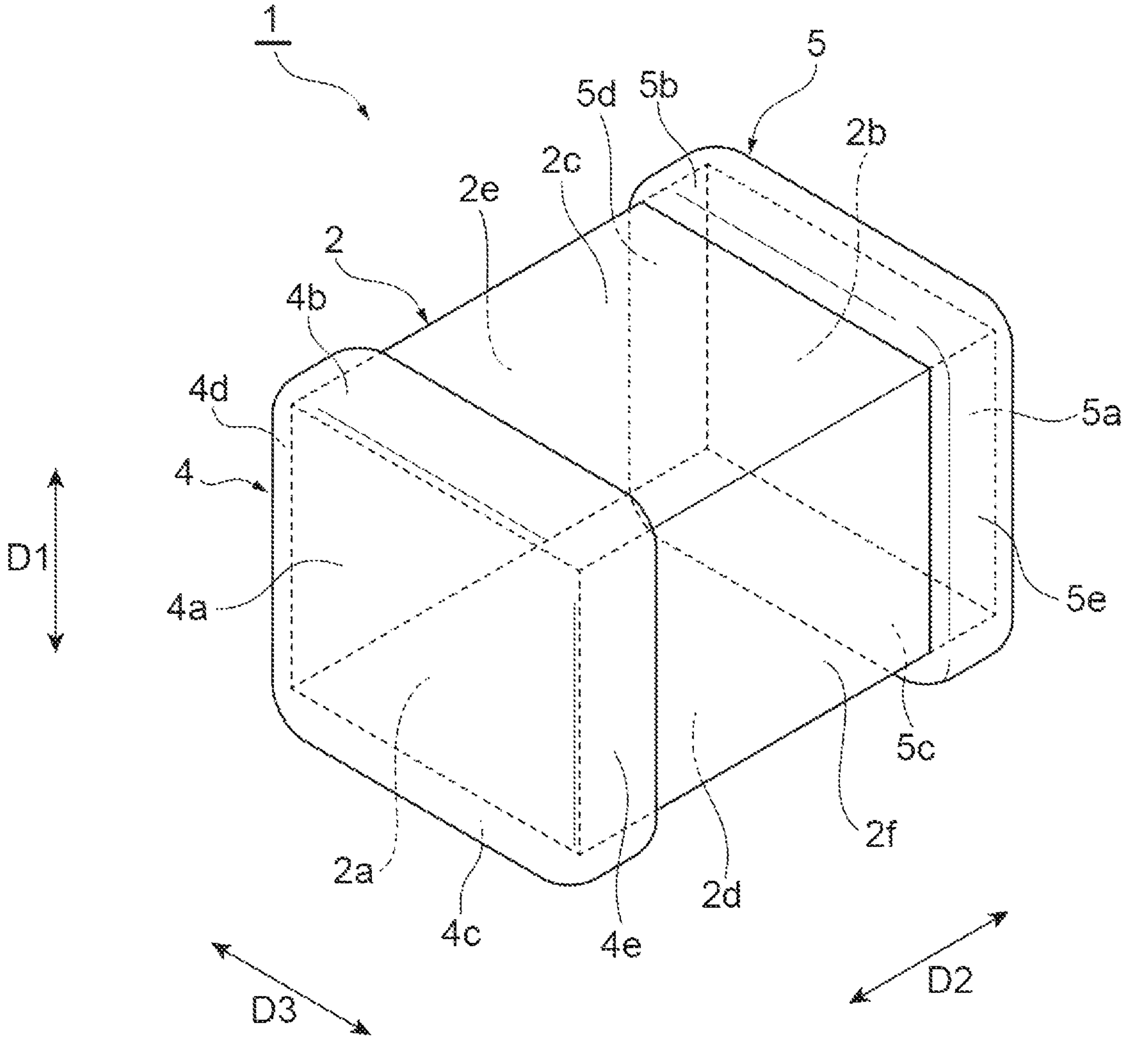
FIG. 1 is a perspective view illustrating a multilayer coil component according to an embodiment.

Hereinafter, an embodiment of the present invention will be described in detail with reference to the accompanying drawings. It should be noted that the same reference numerals will be used for the same elements or elements having the same functions in the description with redundant description omitted.

FIG. 1 is a perspective view illustrating a multilayer coil component according to an embodiment. As illustrated in FIG. 1, a multilayer coil component 1 according to the present embodiment includes an element body 2 having a rectangular parallelepiped shape and a pair of external electrodes 4 and 5 disposed on the surface of the element body 2. The pair of external electrodes 4 and 5 are respectively disposed in both end portions of the element body 2 and are separated from each other. The rectangular parallelepiped shape includes a rectangular parallelepiped shape in which the corner and ridge portions are chamfered and a rectangular parallelepiped shape in which the corner and ridge portions are rounded. The multilayer coil component 1 can be applied to, for example, a bead inductor or a power inductor.

The element body 2 has a pair of end surfaces 2*a* and 2*b* and four side surfaces 2*c*, 2*d*, 2*e*, and 2*f* as its surface. The pair of end surfaces 2*a* and 2*b* oppose each other. The pair of side surfaces 2*c* and 2*d* oppose each other. The pair of side surfaces 2*e* and 2*f* oppose each other. Each of the end surfaces 2*a* and 2*b* is adjacent to each of the side surfaces 2*c*, 2*d*, 2*e*, and 2*f*.

In the present embodiment, the direction in which the pair of side surfaces 2*c* and 2*d* oppose each other (first direction D1) is the height direction of the element body 2. The direction in which the pair of end surfaces 2*a* and 2*b* oppose each other (second direction D2) is the length direction of the element body 2. The direction in which the pair of side surfaces 2*e* and 2*f* oppose each other (third direction D3) is the width direction of the element body 2. The first direction D1, the second direction D2, and the third direction D3 are mutually orthogonal.

The length of the element body 2 in the second direction D2 exceeds the length of the element body 2 in the first direction D1 and the length of the element body 2 in the third direction D3. The length of the element body 2 in the first direction D1 is equivalent to the length of the element body 2 in the third direction D3. In other words, in the present embodiment, each of the end surfaces 2*a* and 2*b* has a square shape and each of the side surfaces 2*c*, 2*d*, 2*e*, and 2*f* has a rectangular shape. For example, the length of the element body 2 in the second direction D2 is 1.0 mm, the length of the element body 2 in the first direction D1 is 0.5 mm, and the length of the element body 2 in the third direction D3 is 0.5 mm. For example, the length of the element body 2 in the second direction D2 may be 0.6 mm, the length of the element body 2 in the first direction D1 may be 0.3 mm, and the length of the element body 2 in the third direction D3 may be 0.3 mm.

"Equivalent" may mean not only "equal" but also a value including a slight difference, a manufacturing error, or the like in a preset range. For example, it is defined that a plurality of values are equivalent insofar as the plurality of values are included in the range of the average value ±5% of the plurality of values.

The length of the element body 2 in the first direction D1 may be different from the length of the element body 2 in the third direction D3. For example, the length of the element body 2 in the second direction D2 may be 1.0 mm, the length of the element body 2 in the first direction D1 may be 0.5 mm, and the length of the element body 2 in the third direction D3 may be 0.7 mm. For example, the length of the element body 2 in the second direction D2 may be 0.6 mm, the length of the element body 2 in the first direction D1 may be 0.3 mm, and the length of the element body 2 in the third direction D3 may be 0.45 mm. The length of the element body 2 in the second direction D2 may be equivalent to the length of the element body 2 in the first direction D1 and the length of the element body 2 in the third direction D3.

The pair of end surfaces 2*a* and 2*b* extend in the first direction D1 in such a way as to interconnect the pair of side surfaces 2*c* and 2*d*. The pair of end surfaces 2*a* and 2*b* also extend in the third direction D3 in such a way as to interconnect the pair of side surfaces 2*e* and 2*f*. The pair of side surfaces 2*c* and 2*d* extend in the second direction D2 in such a way as to interconnect the pair of end surfaces 2*a* and 2*b*. The pair of side surfaces 2*c* and 2*d* also extend in the third direction D3 in such a way as to interconnect the pair of side surfaces 2*e* and 2*f*. The pair of side surfaces 2*e* and 2*f* extend in the first direction D1 in such a way as to interconnect the pair of side surfaces 2*c* and 2*d*. The pair of side surfaces 2*e* and 2*f* also extend in the second direction D2 in such a way as to interconnect the pair of end surfaces 2*a* and 2*b*.

The element body 2 includes a plurality of insulator layers 10 (see FIG. 3) that is laminated. In other words, the element body 2 has the plurality of insulator layers 10 laminated in the first direction D1. The plurality of insulator layers 10 are laminated in the direction in which the side surface 2*c* and the side surface 2*d* oppose each other. In other words, the lamination direction of the plurality of insulator layers 10 coincides with the direction in which the side surface 2*c* and the side surface 2*d* oppose each other. Hereinafter, the direction in which the side surface 2*c* and the side surface 2*d* oppose each other will also be referred to as "lamination direction". Each insulator layer 10 has a substantially rectangular shape. In the actual element body 2, the insulator layers 10 are integrated in such a way that boundaries between the layers 10 cannot be visually recognized.

Each insulator layer 10 is made of a sintered body of a ceramic green sheet containing a ferrite material (such as Ni—Cu—Zn-based, Ni—Cu—Zn—Mg-based, and Ni—Cu-based ferrite materials).

In the multilayer coil component 1, any of the side surfaces 2*c*, 2*d*, 2*e*, and 2*f* can constitute a mounting surface. The mounting surface is defined as a surface opposing an electronic device (not illustrated) when, for example, the multilayer coil component 1 is mounted on the electronic device (such as a circuit board and an electronic component).

The pair of external electrodes 4 and 5 are disposed on the pair of end surfaces 2*a* and 2*b*. The pair of external electrodes 4 and 5 are separated from each other in the direction in which the pair of end surfaces 2*a* and 2*b* oppose each other (second direction D2). The pair of external electrodes 4 and 5 are electrically connected to both ends of a first coil C1 and a second coil C2. The external electrode 4 is disposed on the end surface 2*a* side of the element body 2, is electrically connected to one end of the first coil C1, and is electrically connected to one end of the second coil C2. The external electrode 5 is disposed on the end surface 2*b* side of the element body 2, is electrically connected to the other end of the first coil C1, and is electrically connected to the other end of the second coil C2.

The external electrodes 4 and 5 contain a conductive material (such as Ag or Pd). The external electrodes 4 and 5 are configured as sintered bodies of conductive paste containing conductive metal powder (such as Ag powder or Pd powder) and glass frit. Plating layers are formed on the surfaces of the external electrodes 4 and 5 by the external electrodes 4 and 5 being electroplated. Ni, Sn, and so on are used for the electroplating.

The external electrode 4 includes the five electrode parts of an electrode part 4*a* positioned on the end surface 2*a*, an electrode part 4*b* positioned on the side surface 2*c*, an electrode part 4*c* positioned on the side surface 2*d*, an electrode part 4_d_ positioned on the side surface 2_e_, and an electrode part 4_e_ positioned on the side surface 2_f_. The electrode part 4_a_, the electrode part 4_b_, the electrode part 4_c_, the electrode part 4_d_, and the electrode part 4_e_ are connected in the ridge portion of the element body 2 and are electrically connected mutually. The external electrode 4 is disposed on the end surface 2_a_ at the least. The external electrode 4 is formed over the five surfaces of the end surface 2_a_, the pair of side surfaces 2_c_ and 2_d_, and the pair of side surfaces 2_e_ and 2_f_. The electrode part 4_a_, the electrode part 4_b_, the electrode part 4_c_, the electrode part 4_d_, and the electrode part 4_e_ are integrally formed.

The external electrode 5 includes the five electrode parts of an electrode part 5_a_ positioned on the end surface 2_b_, an electrode part 5_b_ positioned on the side surface 2_c_, an electrode part 5_c_ positioned on the side surface 2_d_, an electrode part 5_d_ positioned on the side surface 2_e_, and an electrode part 5_e_ positioned on the side surface 2_f_. The electrode part 5_a_, the electrode part 5_b_, the electrode part 5_c_, the electrode part 5_d_, and the electrode part 5_e_ are connected in the ridge portion of the element body 2 and are electrically connected mutually. The external electrode 5 is disposed on the end surface 2_b_ at the least. The external electrode 5 is formed over the five surfaces of the end surface 2_b_, the pair of side surfaces 2_c_ and 2_d_, and the pair of side surfaces 2_e_ and 2_f_. The electrode part 5_a_, the electrode part 5_b_, the electrode part 5_c_, the electrode part 5_d_, and the electrode part 5_e_ are integrally formed.

Figure 2:
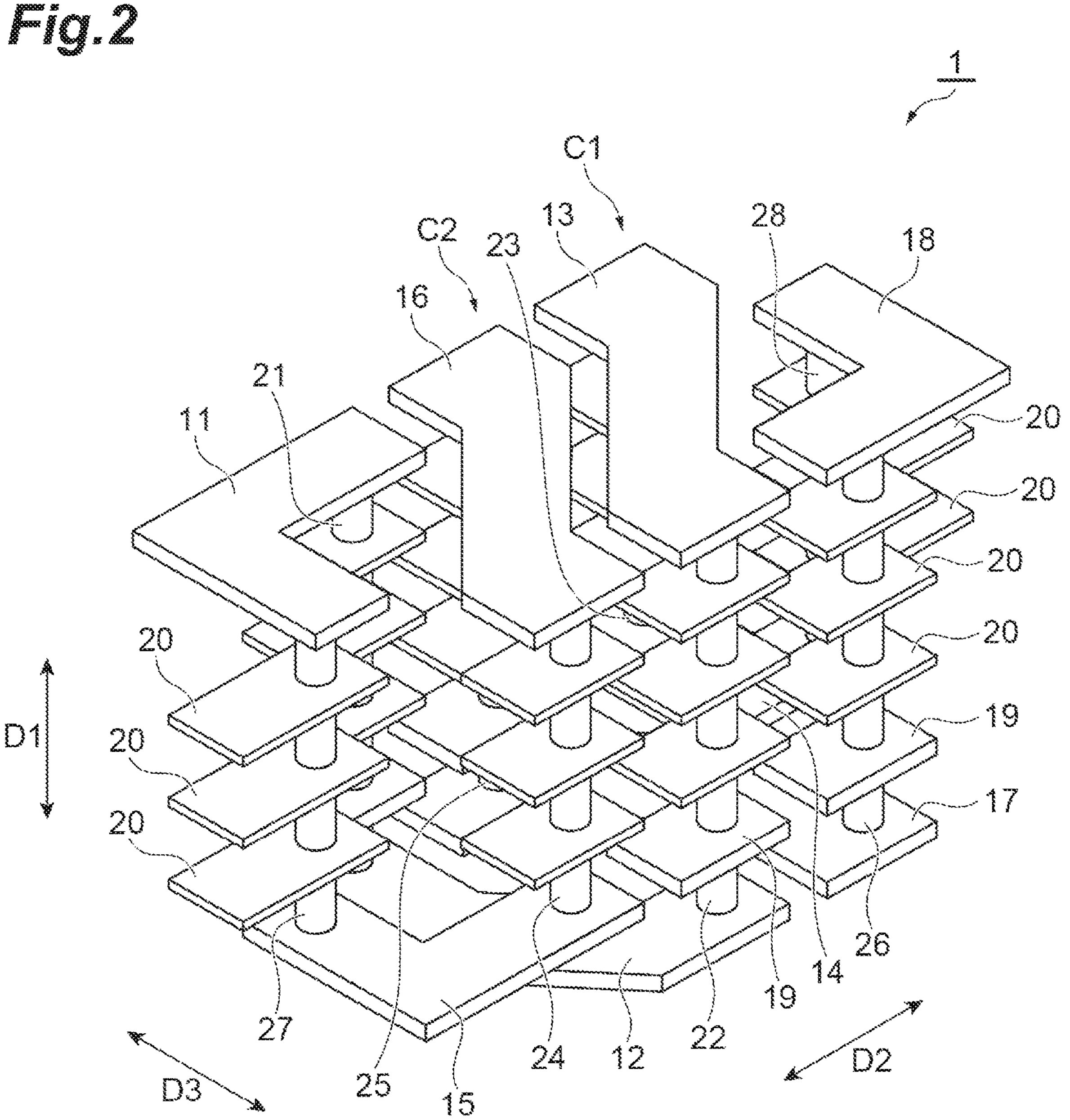
FIG. 2 is a perspective view illustrating the internal configuration of the multilayer coil component of FIG. 1.
Figure 3:
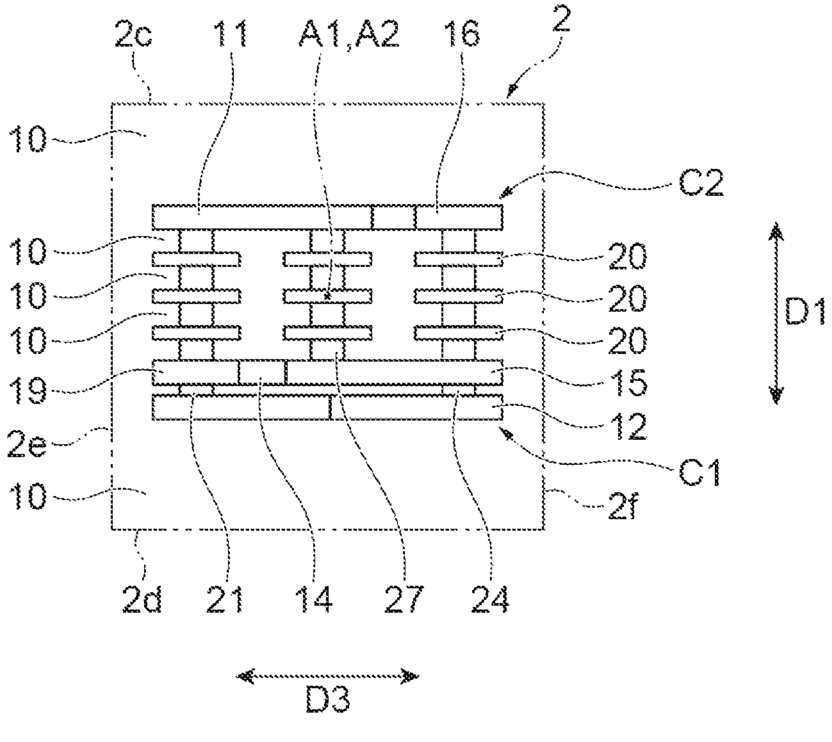
FIG. 3 is a side view illustrating the internal configuration of the multilayer coil component of FIG. 1.

FIG. 2 is a perspective view illustrating the internal configuration of the multilayer coil component of FIG. 1. The element body 2 and the external electrodes 4 and 5 are not illustrated in FIG. 2. FIG. 3 is a side view illustrating the internal configuration of the multilayer coil component of FIG. 1. The internal configuration of the multilayer coil component 1 as viewed from the end surface 2_a_ side is illustrated in FIG. 3. In FIG. 3, the external electrodes 4 and 5 are not illustrated and the element body 2 is indicated by a two-dot chain line.

As illustrated in FIGS. 2 and 3, the multilayer coil component 1 includes the first coil C1 and the second coil C2. The first coil C1 and the second coil C2 are disposed in the element body 2. The first coil C1 has a coil shaft A1 along the second direction D2. The second coil C2 has a coil shaft A2 along the second direction D2. The coil shaft A1 is disposed inside the spiral that is formed by the second coil C2. In other words, it can be said that the region inside the spiral that is formed by the first coil C1 and the region inside the spiral that is formed by the second coil C2 have parts overlapping each other. The coil shaft A2 is disposed inside the spiral that is formed by the first coil C1.

The first coil C1 has conductor layers 11 to 14 and through hole conductors 21 to 23. The second coil C2 has conductor layers 15 to 18 and through hole conductors 24 to 26. The multilayer coil component 1 further includes a plurality of conductor layers 19, a plurality of conductor layers 20, and through hole conductors 27 and 28. The conductor layers 11 to 20 and the through hole conductors 21 to 28 contain a conductive material (such as Ag or Pd). The conductor layers 11 to 20 and the through hole conductors 21 to 28 are configured as sintered bodies of conductive paste containing a conductive material (such as Ag powder or Pd powder).

Figure 4:
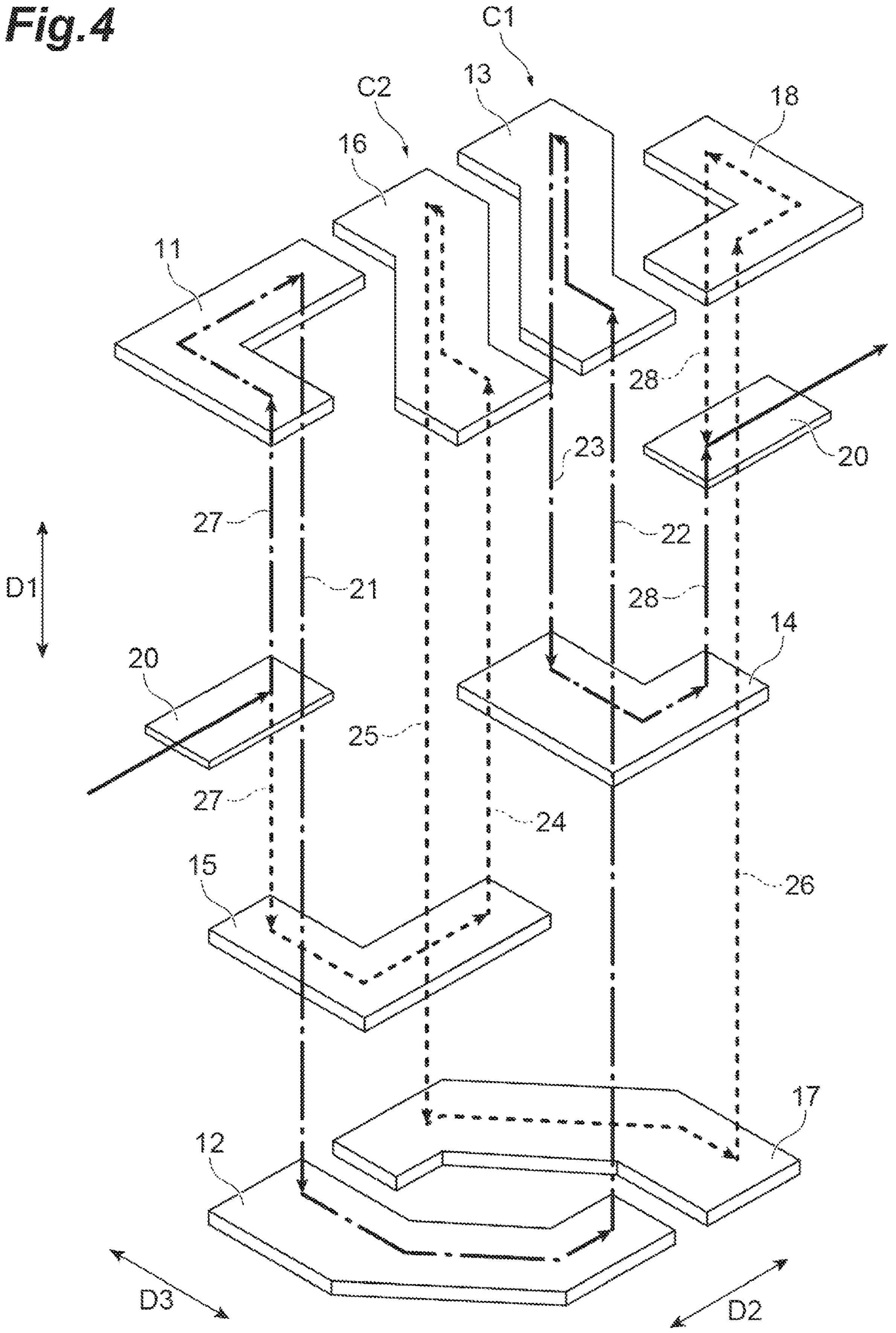
FIG. 4 is an exploded perspective view for describing an electric current flowing through a first coil and a second coil.

FIG. 4 is an exploded perspective view for describing an electric current flowing through the first coil and the second coil. The conductor layers 11 to 18, the pair of conductor layers 20, and the through hole conductors 21 to 28 are illustrated in FIG. 4. As illustrated in FIGS. 2 to 4, the conductor layers 11, 13, 16, and 18 are disposed on the same insulator layer 10. In other words, the conductor layers 11, 13, 16, and 18 are disposed at the same position in the first direction D1. The conductor layers 12 and 17 are disposed on the same insulator layer 10. In other words, the conductor layers 12 and 17 are disposed at the same position in the first direction D1. The conductor layers 14 and 15 and the plurality of conductor layers 19 are disposed on the same insulator layer 10. In other words, the conductor layers 14 and 15 and the plurality of conductor layers 19 are disposed at the same position in the first direction D1. In the present embodiment, the number of the conductor layers 19 is four.

The insulator layer 10 where the conductor layers 12 and 17 are disposed, the insulator layer 10 where the conductor layers 14 and 15 and the plurality of conductor layers 19 are disposed, the insulator layer 10 where the plurality of conductor layers 20 are disposed, and the insulator layer 10 where the conductor layers 11, 13, 16, and 18 are disposed are laminated in this order in the first direction D1 from the side surface 2_d_ side. In the present embodiment, the insulator layer 10 where the plurality of conductor layers 20 are disposed has a three-layer structure and is laminated in the first direction D1. Eight conductor layers 20 are disposed with respect to one insulator layer 10. The insulator layer 10 where the plurality of conductor layers 20 are disposed may have a structure having two or less layers or four or more layers.

The conductor layers 19 and 20 are rectangular when viewed from the first direction D1. The conductor layer 20 is thinner than the conductor layers 11 to 19. The thickness of the conductor layer 20 (length in the first direction D1) is, for example, 30% or more and 70% or less of the thickness of the conductor layers 11 to 19 (length in the first direction D1). The thickness of the conductor layer 20 is, for example, 12 μm or more and 20 μm or less. The thickness of the conductor layers 11 to 19 is, for example, 28 μm or more and 40 μm or less. The thickness of the insulator layer 10 where the plurality of conductor layers 20 are disposed (length in the first direction D1) is smaller than the thickness of the insulator layer 10 where the conductor layers 11 to 19 are disposed (length in the first direction D1).

The conductor layers 11 and 13 are disposed on one side in the first direction D1 (side surface 2_c_ side) with respect to the coil shaft A1. The conductor layers 12 and 14 are disposed on the other side in the first direction D1 (side surface 2_d_ side) with respect to the coil shaft A1. The conductor layers 16 and 18 are disposed on one side in the first direction D1 (side surface 2_c_ side) with respect to the coil shaft A2. The conductor layers 15 and 17 are disposed on the other side in the first direction D1 (side surface 2_d_ side) with respect to the coil shaft A2.

The conductor layers 11, 13, 16, and 18 are disposed closer to the side surface 2_c_ side in the first direction D1 than the conductor layers 12, 14, 15, 17, 19, and 20. The conductor layers 12 and 17 are disposed closer to the side surface 2_d_ side in the first direction D1 than the conductor layers 11, 13 to 16, and 18 to 20. The conductor layers 14 and 15 and the plurality of conductor layers 19 are disposed between the conductor layers 11, 13, 16, and 18 and the conductor layers 12 and 17 in the first direction D1. The plurality of conductor layers 20 are disposed between the conductor layers 11, 13, 16, and 18 and the conductor layers 14 and 15 and the plurality of conductor layers 19 in the first direction D1.

Figure 5:
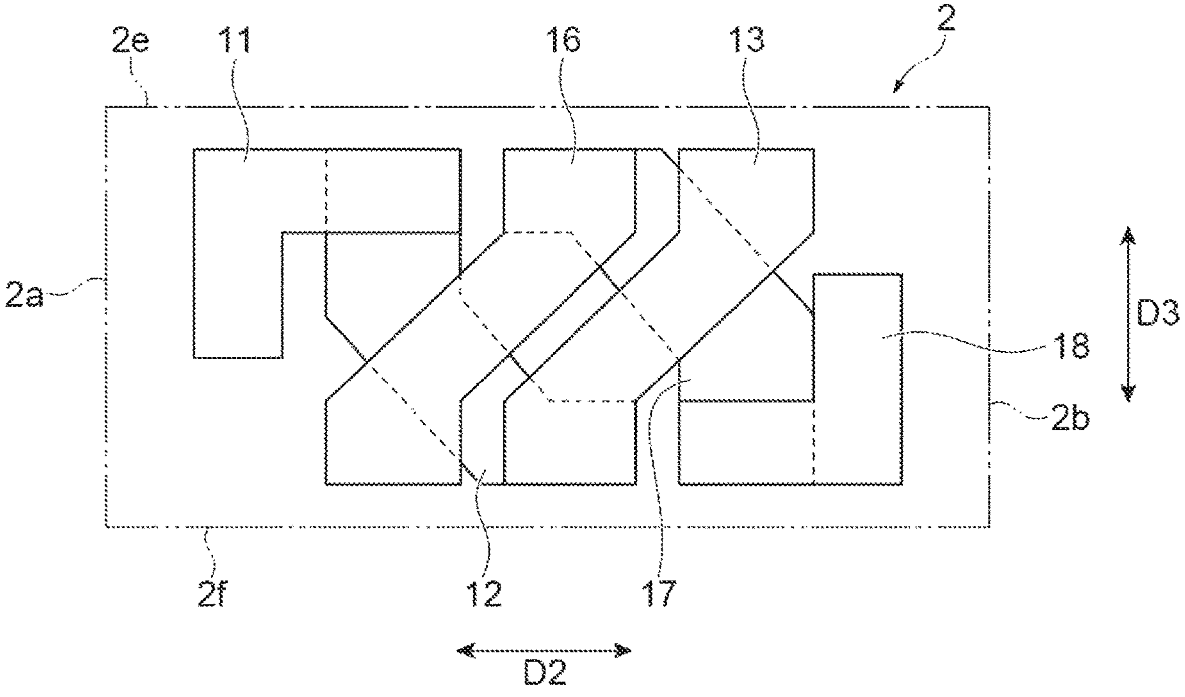
FIG. 5 is a plan view illustrating the positional relationship of conductor layers constituting the first coil and the second coil.

FIG. 5 is a plan view illustrating the positional relationship of the conductor layers 11 to 13 and 16 to 18 as viewed from the side surface 2_c_ side. The element body 2 is indicated by a two-dot chain line in FIG. 5. As illustrated in FIG. 5, the conductor layer 12 and the conductor layer 16 intersect with each other when viewed from the first direction D1. The conductor layer 13 and the conductor layer 17 intersect with each other when viewed from the first direction D1. As illustrated in FIGS. 2 to 4, the conductor layer 12 and the conductor layer 16 are separated from each other in the first direction D1. The conductor layer 13 and the conductor layer 17 are separated from each other in the first direction D1.

The through hole conductors 21 to 28 penetrate the insulator layer 10 and extend in the first direction D1. The through hole conductor 21 connects the conductor layer 11 and the conductor layer 12. The through hole conductor 22 connects the conductor layer 12 and the conductor layer 13. The through hole conductor 23 connects the conductor layer 13 and the conductor layer 14. The through hole conductor 24 connects the conductor layer 15 and the conductor layer 16. The through hole conductor 25 connects the conductor layer 16 and the conductor layer 17. The through hole conductor 26 connects the conductor layer 17 and the conductor layer 18. The through hole conductor 27 connects the conductor layer 11 and the conductor layer 15. The through hole conductor 28 connects the conductor layer 14 and the conductor layer 18.

Each of the through hole conductors 21 to 28 includes a plurality of conductor parts arranged along the first direction D1. The conductor parts that are adjacent to each other in the first direction D1 are connected to each other via the conductor layer 19 or the conductor layer 20. In other words, the conductor layers 19 and 20 have a function of electrically interconnecting the conductor parts that are adjacent to each other in the first direction D1 in the through hole conductors 21 to 28. When viewed from the first direction D1, each of the conductor layers 19 and 20 overlaps any of the through hole conductors 21 to 28. Each of the through hole conductors 21, 22, 25, and 26 is configured by five conductor parts being connected by one conductor layer 19 and three conductor layers 20. The through hole conductors 23, 24, 27, and 28 are configured by four conductor parts being connected by three conductor layers 20.

Each conductor layer 20 overlapping the through hole conductor 27 when viewed from the first direction D1 has an end portion that is connected to the electrode part 4*a* and is exposed on the end surface 2*a*. Each conductor layer 20 overlapping the through hole conductor 27 when viewed from the first direction D1 is connected via the through hole conductor 27 to the conductor layer 11 forming one end of the first coil C1 and the conductor layer 15 forming one end of the second coil C2. In other words, the plurality of conductor layers 20 overlapping the through hole conductor 27 when viewed from the first direction D1 electrically connect the first coil C1 and the second coil C2 to the external electrode 4 (see FIG. 1).

Each conductor layer 20 overlapping the through hole conductor 28 when viewed from the first direction D1 has an end portion that is connected to the electrode part 5*a* and is exposed on the end surface 2*b*. Each conductor layer 20 overlapping the through hole conductor 28 when viewed from the first direction D1 is connected via the through hole conductor 28 to the conductor layer 14 forming the other end of the first coil C1 and the conductor layer 18 forming the other end of the second coil C2. In other words, the plurality of conductor layers 20 overlapping the through hole conductor 28 when viewed from the first direction D1 electrically connect the first coil C1 and the second coil C2 to the external electrode 5 (see FIG. 1).

In this manner, the conductor layer 20 overlapping the through hole conductors 27 and 28 when viewed from the first direction D1 has a function of electrically connecting the first coil C1 and the second coil C2 to the pair of external electrodes 4 and 5 in addition to a function of electrically interconnecting the conductor parts adjacent to each other in the first direction D1 in the through hole conductors 27 and 28. In the present embodiment, the conductor layer 20 overlapping the through hole conductors 27 and 28 when viewed from the first direction D1 is drawn out to the end surfaces 2*a* and 2*b*, and thus is longer in the second direction D2 than the other conductor layers 20 overlapping the through hole conductors 21 to 26. Alternatively, the conductor layers 20 may be equivalent in length.

The electric current flowing through the first coil C1 and the second coil C2 will be described with reference to FIG. 4. FIG. 4 illustrates a case where the electric current flows from the external electrode 4 (see FIG. 1) to the external electrode 5 (see FIG. 1) through the first coil C 1 and the second coil C2. As illustrated in FIG. 4, the electric current flows from the external electrode 4 into each conductor layer 20 having the end portion connected to the electrode part 4*a*. Then, the electric current branches and flows through the through hole conductor 27 into each of the conductor layer 11 forming one end of the first coil C1 and the conductor layer 15 forming one end of the second coil C2. The electric current that flows toward the first coil C1 through the through hole conductor 27 is indicated by a one-dot chain line arrow. The electric current that flows toward the second coil C2 through the through hole conductor 27 is indicated by a dashed line arrow.

The electric current that has flowed into the conductor layer 11 (arrow indicated by the one-dot chain line) flows into the conductor layer 12 through the through hole conductor 21, flows into the conductor layer 13 through the through hole conductor 22, and then flows into the conductor layer 14 through the through hole conductor 23. Then, the electric current flows through the through hole conductor 28 into each conductor layer 20 having the end portion connected to the electrode part 5*a*.

The electric current that has flowed into the conductor layer 15 (arrow indicated by the dashed line) flows into the conductor layer 16 through the through hole conductor 24, flows into the conductor layer 17 through the through hole conductor 25, and then flows into the conductor layer 18 through the through hole conductor 26. Then, the electric current flows through the through hole conductor 28 into each conductor layer 20 having the end portion connected to the electrode part 5*a*.

The electric current that has flowed through the first coil C1 and the electric current that has flowed through the second coil C2 flow through the through hole conductor 28 and then merge at each conductor layer 20 having the end portion connected to the electrode part 5*a*. Then, the electric current flows into the external electrode 5. The electric current may flow from the external electrode 5 to the external electrode 4 through the first coil C1 and the second coil C2. In this case, the direction of each arrow in FIG. 4 is opposite.

As described above, in the multilayer coil component 1, the coil shaft A1 of the first coil C1 and the coil shaft A2 of the second coil C2 coincide with the second direction D2, which is the direction in which the pair of end surfaces 2*a* and 2*b* oppose each other. Accordingly, it is possible to reduce the stray capacitance formed between the external electrodes 4 and 5 and the first coil C1 and the stray capacitance formed between the external electrodes 4 and 5 and the second coil C2. As a result, a decline in the self-resonant frequency (SRF) of the multilayer coil component 1 is suppressed and high frequency characteristics is improved.

The first coil C1 and the second coil C2 are electrically connected in parallel between the pair of external electrodes 4 and 5. Accordingly, the direct current resistance of the multilayer coil component 1 can be reduced.

The coil shaft A1 of the first coil C1 is disposed inside the second coil C2. In addition, the conductor layer 12 and the conductor layer 16 are separated from each other in the first direction D1 and intersect with each other when viewed from the first direction D1. With such a configuration, the first coil C1 and the second coil C2 can constitute a large spiral while intersecting with each other. Accordingly, the inner diameters of the first coil C1 and the second coil C2 can be increased. As a result, the inductance can be increased.

By allowing the spirals of the first coil C1 and the second coil C2 to intersect with each other, it is possible to shorten the first coil C1 and the second coil C2 in the second direction D2, while maintaining the numbers of turns of the first coil C1 and the second coil C2, as compared with a case where the spirals do not intersect with each other. Accordingly, it is possible to suppress deterioration of characteristics attributable to an increase in the lengths of the magnetic paths of the first coil C1 and the second coil C2. Further, the multilayer coil component 1 can be reduced in size.

The conductor layer 13 and the conductor layer 17 are separated from each other in the first direction D1 and intersect with each other when viewed from the first direction D1. As a result, the first coil C1 and the second coil C2 can increase the numbers of turns while intersecting with each other.

The conductor layer 12 and the conductor layer 17 are disposed at the same position in the first direction D1. Accordingly, it is easy to further increase the inner diameter of the first coil C1 and the inner diameter of the second coil C2. In addition, the conductor layer 13 and the conductor layer 16 are disposed at the same position in the first direction D1. Accordingly, it is easy to further increase the inner diameters of the first coil C1 and the second coil C2.

The first coil C1 and the second coil C2 and the pair of external electrodes 4 and 5 are electrically connected by the plurality of conductor layers 20. The electric resistance of the plurality of conductor layers 20 is inversely proportional to the sum of the cross-sectional areas of the plurality of conductor layers 20. Accordingly, the electric resistance of the plurality of conductor layers 20 decreases as the number of the conductor layers 20 increases. Accordingly, the electric resistance can be lowered as compared with a case where the conductor layer 20 is a single layer.

The thickness of each conductor layer 20 is smaller than the thickness of the conductor layers 11 to 19. Accordingly, it is possible to easily cut a laminated body substrate together with the plurality of conductor layers 20 in turning the element bodies 2 into individual pieces by cutting the laminated body substrate. Accordingly, it is possible to easily form a state where the end portion of the conductor layer 20 is exposed on the end surfaces 2*a* and 2*b*.

The plurality of conductor layers 20 are disposed between the conductor layer 12 and the conductor layer 13 in the first direction D1 and are disposed between the conductor layer 16 and the conductor layer 17 in the first direction D1. Accordingly, it is possible to easily increase the inner diameters of the first coil C1 and the second coil C2 in the first direction D1 by increasing the number of the conductor layers 20. As a result, the inductance can be improved.

Although the embodiment has been described above, the present invention is not necessarily limited to the embodiment described above and various modifications can be made within the gist thereof.

Although the conductor layers 11, 13, 16, and 18 are disposed at the same position in the first direction D1, the conductor layers 11, 13, 16, and 18 may be disposed at different positions in the first direction D1. In addition, although the conductor layers 12 and 17 and the conductor layers 14 and 15 are disposed at different positions in the first direction D1, the conductor layers 12 and 17 and the conductor layers 14 and 15 may be disposed at the same position in the first direction D1.

The first coil C1 may have a configuration in which a loop including the conductor layer 12, the through hole conductor 22, the conductor layer 13, and the through hole conductor 23 is repeated a plurality of times. In other words, the first coil C1 may have a plurality of loops including the conductor layer 12, the through hole conductor 22, the conductor layer 13, and the through hole conductor 23 between the conductor layer 11 and the conductor layer 14 in the second direction D2. As a result, the number of turns of the first coil C1 can be increased.

The second coil C2 may have a configuration in which a loop including the conductor layer 16, the through hole conductor 25, the conductor layer 17, and the through hole conductor 26 is repeated a plurality of times. In other words, the second coil C2 may have a plurality of loops including the conductor layer 16, the through hole conductor 25, the conductor layer 17, and the through hole conductor 26 between the conductor layer 15 and the conductor layer 18 in the second direction D2. As a result, the number of turns of the second coil C2 can be increased.

What is claimed is:

1. A multilayer coil component comprising:

an element body including a plurality of insulator layers laminated in a first direction and having a pair of end surfaces opposing each other in a second direction orthogonal to the first direction;

a first coil and a second coil disposed in the element body and respectively having coil axes along the second direction; and a pair of external electrodes disposed on the pair of end surfaces and electrically connected to both ends of the first coil and the second coil, wherein the first coil includes a first conductor layer, a second conductor layer, and a first through hole conductor extending in the first direction and connecting the first conductor layer and the second conductor layer, the second coil includes a third conductor layer, a fourth conductor layer, and a second through hole conductor extending in the first direction and connecting the third conductor layer and the fourth conductor layer, the first coil and the second coil are electrically connected in parallel between the pair of external electrodes, the coil axis of the first coil is disposed inside the second coil, the first conductor layer and the third conductor layer are separated from each other in the first direction and intersect with each other when viewed from the first direction, a fifth conductor layer is arranged between the first conductor layer and the third conductor layer in the first direction, and wherein the fifth conductor layer is configured to supply current to both the first conductor layer and the third conductor layer.

2. The multilayer coil component according to claim 1, wherein the second conductor layer and the fourth conductor layer are separated from each other in the first direction and intersect with each other when viewed from the first direction.

3. The multilayer coil component according to claim 1, wherein the first conductor layer and the fourth conductor layer are disposed at the same position in the first direction.

4. The multilayer coil component according to claim 1, wherein the second conductor layer and the third conductor layer are disposed at the same position in the first direction.

5. The multilayer coil component according to claim 1, wherein the fifth conductor layer is one of a plurality of fifth conductor layers electrically connecting the first coil and the second coil to the external electrode.

6. The multilayer coil component according to claim 5, wherein a thickness of each of the fifth conductor layers is smaller than a thickness of the first conductor layer, a thickness of the second conductor layer, a thickness of the third conductor layer, and a thickness of the fourth conductor layer.

7. The multilayer coil component according to claim 5, wherein the plurality of fifth conductor layers are disposed between the first conductor layer and the second conductor layer in the first direction and are disposed between the third conductor layer and the fourth conductor layer in the first direction.

8. The multilayer coil component according to claim 5, wherein the plurality of fifth conductor layers are laminated in the first direction.

9. The multilayer coil component according to claim 1, wherein each of the first through hole conductor and the second through hole conductor includes a plurality of conductor parts arranged along the first direction.

10. The multilayer coil component according to claim 1, wherein the first through hole conductor and the second through hole conductor are separated from each other in a third direction orthogonal to the first direction and the second direction.

11. The multilayer coil component according to claim 1, wherein first coil further includes a sixth conductor layer and a third through hole conductor extending in the first direction and connecting the first conductor layer and the sixth conductor layer.

12. The multilayer coil component according to claim 11, wherein the second conductor layer and the sixth conductor layer are disposed at the same position in the first direction.

13. The multilayer coil component according to claim 11, wherein the sixth conductor layer has an L-shape when viewed from the first direction.

14. The multilayer coil component according to claim 1, wherein first coil further includes a seventh conductor layer and a fourth through hole conductor extending in the first direction and connecting the second conductor layer and the seventh conductor layer.

15. The multilayer coil component according to claim 14, wherein the second conductor layer and the seventh conductor layer are disposed at different position in the first direction.

16. The multilayer coil component according to claim 1, wherein second coil further includes an eighth conductor layer and a fifth through hole conductor extending in the first direction and connecting the fourth conductor layer and the eighth conductor layer.

17. The multilayer coil component according to claim 16, wherein the third conductor layer and the eighth conductor layer are disposed at the same position in the first direction.

18. The multilayer coil component according to claim 16, wherein the eighth conductor layer has an L-shape when viewed from the first direction.

19. The multilayer coil component according to claim 1, wherein second coil further includes a ninth conductor layer and a sixth through hole conductor extending in the first direction and connecting the third conductor layer and the ninth conductor layer.

20. The multilayer coil component according to claim 19, wherein the fourth conductor layer and the ninth conductor layer are disposed at different position in the first direction.

* * * * *